US006316564B1

(12) United States Patent
Huybrechts et al.

(10) Patent No.: US 6,316,564 B1
(45) Date of Patent: Nov. 13, 2001

(54) ACRYLIC BLOCK COPOLYMER PIGMENT DISPERSANTS CONTAINING HETEROCYCLIC GROUPS

(75) Inventors: Josef Huybrechts, Oud-Turnhout (BE); Daniel C. Kraiter, Wilmington, DE (US); Roger Vervloet, Mechelen (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/414,254

(22) Filed: Oct. 7, 1999

(51) Int. Cl.[7] ............... C08F 26/06; C09D 5/00
(52) U.S. Cl. ............ 526/261; 523/160; 523/161
(58) Field of Search ............ 526/261; 523/160, 523/161

(56) References Cited

U.S. PATENT DOCUMENTS

| | | | |
|---|---|---|---|
| 4,032,698 | 6/1977 | Ashe | 526/14 |
| 4,283,512 | 8/1981 | Matsushima et al. | 525/438 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,126 | 6/1985 | Marinace et al. | 430/311 |
| 4,656,226 | 4/1987 | Hutchins et al. | 525/93 |
| 4,711,910 | 12/1987 | Statton et al. | 521/107 |
| 4,755,563 | 7/1988 | West | 525/287 |
| 4,764,632 | 8/1988 | Cohen | 556/27 |
| 4,812,517 | 3/1989 | West | 525/94 |
| 4,880,884 | 11/1989 | Mullins et al. | 525/469 |
| 4,902,732 | 2/1990 | Itoh et al. | 525/433 |
| 4,942,213 | 7/1990 | Haubennestel et al. | 528/28 |
| 5,085,698 | 2/1992 | Ma et al. | |
| 5,180,760 | 1/1993 | Oshibe et al. | 523/169 |
| 5,205,861 | 4/1993 | Matrick | 106/20 D |
| 5,205,949 | 4/1993 | Nalesnik et al. | |
| 5,298,568 | 3/1994 | Suzuki | 525/327 |
| 5,371,135 | 12/1994 | Suzuki | 524/517 |
| 5,424,364 | 6/1995 | Simms et al. | 525/170 |
| 5,476,544 | 12/1995 | Endo et al. | 106/499 |
| 5,648,446 | 7/1997 | Oishi et al. | 528/60 |
| 5,674,947 | 10/1997 | Oishi et al. | 525/289 |
| 5,804,662 | 9/1998 | Schade et al. | 525/262 |
| 5,854,331 | 12/1998 | Ma et al. | |

FOREIGN PATENT DOCUMENTS

| | | |
|---|---|---|
| 524816 | 11/1976 | (CH) . |
| 0 218 436 A2 | 4/1987 | (EP) . |
| 0 414 343 A1 | 2/1991 | (EP) . |
| 0 438 240 A2 | 7/1991 | (EP) . |
| 58027716 A | 2/1983 | (JP) . |
| 60127325 A | 7/1985 | (JP) . |
| 02202945 A | 8/1990 | (JP) . |
| 02202967 A | 8/1990 | (JP) . |
| 05230126 A | 9/1993 | (JP) . |
| 05271636 A | 10/1993 | (JP) . |
| 05295341 A | 11/1993 | (JP) . |
| 06093171 A | 4/1994 | (JP) . |
| 07011105 A | 1/1995 | (JP) . |
| 07331084 A | 12/1995 | (JP) . |
| 08188733 A | 7/1996 | (JP) . |
| 09087570 A | 3/1997 | (JP) . |
| 09157394 A | 6/1997 | (JP) . |
| 10017802 A2 | 1/1998 | (JP) . |
| 2050389 | 12/1995 | (RU) . |
| 98/13443 | 4/1998 | (WO) . |

OTHER PUBLICATIONS

Small et al., Amine–Containing Block Copolymers; Long––Term Adhesion Promoters and Corrosion–Resistant Coatings, *ACS, Polymer Preprints*, 37, 1996.

Kent et al., Adsorbed Monolayers Based on Functionalised Diblock Copolymers, *Macromol.*, 30, 1997.

Antonietti et al., Novel Amphiphilic Block Copolymers by Polymer Reactions and their Use for Solubilisation of Metal Salts and Metal Colloids, *Macromol.*, 29, 1996.

*Primary Examiner*—James J. Seidleck
*Assistant Examiner*—Olga Asinovsky
(74) *Attorney, Agent, or Firm*—Steven C. Benjamin

(57) ABSTRACT

Acrylic AB block copolymers prepared by group transfer polymerization that are useful as pigment dispersants, characterized by mononuclear or dinuclear heterocyclic groups bonded to the highly polar anchoring A segment of the block copolymer backbone to facilitate attachment on a pigment surface and improve dispersant efficiency in solvent-borne paint systems.

17 Claims, No Drawings

ACRYLIC BLOCK COPOLYMER PIGMENT DISPERSANTS CONTAINING HETEROCYCLIC GROUPS

BACKGROUND OF THE INVENTION

This invention concerns a pigment dispersant, more particularly, it concerns a pigment dispersant comprising an acrylic block copolymer, prepared by group transfer polymerization, in which one of the blocks is modified with a polar heterocyclic group to facilitate attachment to a pigment surface.

Acrylic block copolymer pigment dispersants prepared by group transfer polymerization (GTP) are known. Typically, such dispersants are of the AB, ABA or BAB types. All have at least one polar segment known as the A segment to facilitate attachment to a pigment surface, and at least one non-polar segment known as the B segment to enhance steric stabilization of the pigment particles in a dispersion and prevent flocculation. In addition, the A block may be modified with pendant polar groups for increased effectiveness, as for example, as taught in Hutchins et al. U.S. Pat. No. 4,656,226, issued Apr. 7, 1987. Such compositions can also be prepared with hydroxyl functional groups in the B segment to allow crosslinking in the final thermoset paint composition so that the dispersant will become part of the network structure; however, the dispersant properties may be negatively influenced.

Continued effort has been directed to improve the performance of pigment dispersants, and in particular to find a new class of acrylic block copolymer dispersants which are well suited for dispersing solid pigments in various liquid media, particularly solvent-borne paint systems.

SUMMARY OF THE INVENTION

The present invention provides a composition suitable for use as a pigment dispersant, comprising an acrylic block copolymer, prepared by GTP polymerization, having at least one relatively polar A segment and at least one relatively non-polar B segment bonded together, each segment having a backbone preferably consisting essentially of polymerized methacrylic monomer units, and said A segment having bonded thereto one or more polar heterocyclic groups selected from the group consisting of mononuclear or dinuclear five and/or six membered rings containing one or more nitrogen atoms as part of the ring and optionally an oxygen and/or sulfur atom wherein the ring contains at least one nitrogen not bonded to a hydrogen atom. The heterocyclic groups are provided as pendant groups either attached directly on the A segment or introduced through urethane and/or urea linkages. The block copolymer preferably also contains hydroxyl functional groups in either or both A and B segment. It is also preferred that the block copolymer be of the AB type.

The present invention is based on the discovery that incorporation of the heterocyclic groups mentioned above on the A segment provide acrylic block copolymers with excellent pigment dispersant characteristics, even in the presence of hydroxyl functional groups on the polymer backbone which are usually needed for crosslinking purposes and to improve the compatibility with the other binder constituents present in the final paint composition.

Preferred heterocyclic groups are triazole, pyrimidine, imidazole, pyridine, morpholine, pyrrolidine, piperazine, piperidine, benzimidazole, benzothiazole and/or triazine. These heterocyclic groups may be unsubstituted or may contain substituents such as, e.g., alkyl, aryl, halogen, and alkoxy groups.

DETAILED DESCRIPTION OF THE INVENTION

GTP techniques can be, and preferably are, used to produce the acrylic block copolymers of the present invention. GTP techniques are known to produce acrylic block copolymers of low molecular weight, generally between 1,300 and 20,000 number average molecular weight ($M_n$), with a more precisely controlled molecular weight distribution and compositional distribution. This permits the formation of blocks with low polydispersity and uniform functionality and provides for more efficient dispersing action. GTP techniques are well known and described at length in Hutchins et al. U.S. Pat. No. 4,656,226, issued Apr. 7, 1987, hereby incorporated by reference.

In accordance with that technique, generally an unsaturated monomer is contacted with an initiator and a catalyst system containing silicon, tin or germanium, under which polymerization proceeds in a controlled manner, as opposed to the random manner typical of polymerization reactions, so that a substantially linear polymer can be prepared having polymer chains which are uniform and of the desired molecular weight. Herein, the desired molecular weight for the block copolymer is within the above stated range, although in the present invention, below 13,000 $M_n$ is particularly preferred.

The acrylic block copolymers of the present invention produced by such techniques preferably have at least one relatively highly polar A segment which functions as an anchoring side on the pigment surface and at least one relatively non-polar B stabilizing segment, usually of higher molecular weight, which preferably contains functional groups for reaction in a thermoset paint composition. The polar A segment is designed to absorb on the surface of a pigment by acid-base interaction, while the B segment provides steric stabilization of the pigment particle against flocculation.

In general, the A segment should be: (1) available for interaction with the pigment surface; and (2) of sufficient size to provide irreversible absorption, but not so large as to completely cover the pigment surface or cause collapse of the B segment (typically $M_n$=300–5,000). The B segment should be: (1) of sufficient size to provide steric stabilization (typically $M_n$=1,000 or larger); and (2) compatible (sufficiently soluble to prevent phase separation) with the liquid dispersion media (solvent) and matrix binder polymer.

All molecular weights referred herein are determined by GPC (gel permeation chromatography) using a polystyrene standard.

The B segment, as mentioned above, also preferably contains functional groups, such as, e.g., hydroxyl groups, to provide for crosslinking in a final thermoset paint composition to enable the dispersant to become a part of the network structure and for improved compatibility with the other binder components. In order for these groups to be present, the polar anchoring side (A segment) must not be displaced by these other functional groups, since then the pigment dispersion destabilizes.

The present inventors have found not only that introduction of the heterocyclic groups in the acrylic block copolymers of the general type described above improve their performance as pigment dispersants, but also even more unexpectedly that such heterocyclic groups act as efficient anchoring groups even in the presence of hydroxyl groups on the other segment and in the presence of polar solvents which could compete with adsorption on the pigment surface.

In the present invention, it has been found convenient to first form the basic acrylic block copolymer described above by GTP techniques, and then attach the required heterocyclic group directly or indirectly through functional groups positioned on the A anchoring segment using techniques described below.

In the preparation of the basic block copolymer, the blocks can be prepared in any order. That is, either the A segment or the B segment can be prepared first. Furthermore, while AB block copolymers are generally preferred, ABA and BAB triblocks can also be prepared, if desired. In any event, the backbones of each segment consist essentially of at least one polymerized methacrylate or acrylate ester, although methacrylate esters are mostly preferred. In the context of the present invention, the methacrylate and acrylate units are generally referred to herein as methacrylic and acrylic monomer units.

More specifically, the B segment is preferably prepared from an alkyl methacrylate or a blend of alkyl methacrylates such as methyl methacrylate (MMA), butyl methacrylate (BMA), 2-ethyl hexyl methacrylate, and the like. If desired, hydroxyl functional groups can be introduced through hydroxyalkyl methacrylate monomers such as hydroxy ethyl methacrylate (HEMA), hydroxy propyl methacrylate, and the like. However, the hydroxyl group must be blocked prior to polymerization to avoid reaction with the initiator used in GTP. A possible way of blocking the hydroxyl group is with trimethylsilyl or derivatives. The blocked hydroxyl group can be deblocked after the formation of the block copolymer by hydrolysis. Usually hydroxyl groups are needed in the acrylic block copolymer. The acrylic block copolymer should generally have a hydroxyl value of between 5 and 120. The A segment, on the other hand, requires the presence of functional groups for attachment of the polar heterocyclic groups. As described more fully below, epoxy functional methacrylates such as glycidyl methacrylate (GMA) and the like, hydroxy functional methacrylates such as hydroxy ethyl methacrylate (HEMA) and the like, and amino functional methacrylates such as t-butyl aminoethyl methacrylate (t-BAEMA) and the like, may be used for this purpose.

In the present invention, the A segment generally comprises about 2 to 60% by weight, preferably from about 10 to 30% by weight, of the block copolymer, and the B segment generally comprises about 40 to 98% by weight, preferably from about 70 to 90% by weight, of the block copolymer.

Also in the present invention, for optimum effectiveness, at least about 2% by weight, most preferably at least 50% by weight, of the (meth)acrylic monomer units of the A segment have bonded thereto a heterocyclic group. The heterocyclic group may be a mononuclear or dinuclear five and/or six membered ring containing one or more ring nitrogen atoms and optionally a ring oxygen and/or sulfur atom and having at least one ring nitrogen atom which does not contain a hydrogen atom. As used herein, the term "mononuclear" refers to a lone 5 or 6 membered ring, and the term "dinuclear" refers to a 5 or 6 membered ring fused to another 5 or 6 membered ring. Preferred heterocyclic groups are triazole, pyrimidine, imidazole, pyridine, morpholine, pyrrolidine, piperazine, piperidine, benzimidazole, benzothiazole and/or triazine groups. These may be unsubstituted or may contain substituents such as, e.g., alkyl, aryl, halogen, and alkoxy groups. Lower alkyl substituted imidazole derivatives are especially preferred, such as 2-methyl imidazole and 4-methyl imidazole.

The heterocyclic groups can be attached directly on the anchoring A segment through reaction of a heterocyclic derivative with functional groups provided in the A segment. As an example given below, the heterocyclic groups can be placed as pendant groups on the anchoring A segment through reaction of a heterocyclic derivative with epoxy functional groups. The synthesis of block copolymers from polymerized (meth)acrylic monomer units in which one of the segments produced contains epoxy functional groups is well described in Hutchins et al., U.S. Pat. No. 4,656,226, issued Apr. 7, 1987. For instance, the epoxy group may be obtained through copolymerization of e.g., glycidyl methacrylate (Example 1). The epoxy group can then be reacted in a subsequent reaction with a heterocyclic compound having an active hydrogen atom like —NH—, —NH$_2$, —COOH and —SH. In case of a compound with two active H atoms such as —NH$_2$, the amount of glycidyl functional groups has to be balanced to avoid crosslinking and gelation. In this case, the primary amino functional group —NH$_2$ can also be first modified to a secondary —NH— group through reaction with a mono epoxy derivative. Examples of heterocyclic compounds with an active H atom are given below:

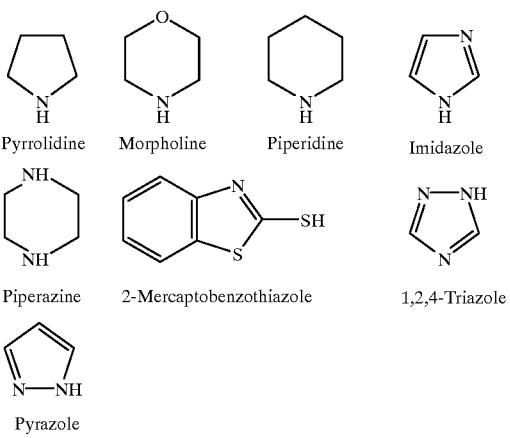

Pyrrolidine   Morpholine   Piperidine   Imidazole

Piperazine   2-Mercaptobenzothiazole   1,2,4-Triazole

Pyrazole

Other possibilities which allow the heterocyclic derivative to be attached directly as pendant groups on the block copolymer is through the reaction of a carboxyl functional heterocyclic derivative with the epoxy groups in the A segment.

The heterocyclic group can also be incorporated in the acrylic block copolymer indirectly through urethane and/or urea linkages. As an example given below, N-(3-aminopropyl)imidazole can be reacted with isophorone diisocyanate on a molar basis to form an intermediate imidazole functional urea with one unreacted isocyanate functional group which in a subsequent step is reacted with amino groups in one of the segments. This amino functional group can be obtained through the copolymerization of e.g. t-butylaminoethyl methacrylate (Example 2) or by reaction of an epoxy functional group with a monoamine or ammonia. Examples of monoamines are ethylamine, propylamine, laurylamine, ethanolamine, isopropanolamine, and 2-amino butanol. The isocyanate functional heterocyclic urea intermediate can also be reacted with a hydroxyl group on the backbone to form a urethane linkage. Heterocyclic functional intermediates with an isocyanate functional group may also be formed through reaction of hydroxyl functional heterocyclic derivatives with di- and/or polyisocyanates. An example is 2-hydroxyethyl morpholine. Such hydroxy functional intermediates may also be formed by reaction of an amino functional heterocyclic derivative with a cyclic carbonate as ethylene carbonate, propylene carbonate, butylene carbonate, glycerine carbonate. Other examples of diisocyanates include but are not limited to toluene diisocyanate, hexamethylene diisocyanate, xylylene diisocyanate, diphenylmethane diisocyanate (MDI), hydrogenated MDI, trimethyl hexamethylenediisocyanate. Possible polyfunctional isocyanates are cyclotrimers and biurets,or reaction products of an excess of the diisocyanates with a polyol precursor.

The new class of heterocyclic acrylic block copolymers of the present invention exhibit excellent performance as dispersants for pigments in liquid media, particularly in solvent-borne paint systems, such as those used in automotive finishing and refinishing, which contain in addition to a pigment and the dispersant, a binder or film former, an organic solvent (i.e., liquid dispersion media) and conventional other additives. The pigments and dispersant may be added individually to the liquid paint media or in dispersion form which is most preferred. If a dispersion is employed, the dispersion generally contains pigment and dispersion media (solvent) compatible with the liquid paint media.

The invention will now be described in greater detail by way of specific examples. All parts and percentages are on a weight basis unless otherwise indicated.

EXAMPLES

In the following Examples 1–2, the preparation procedure of basic AB block copolymers, to which the various heterocyclic groups were attached, is described:

All monomers and solvents were dried by passing over 4A molecular sieves and stored under nitrogen before being used.

Example 1

Preparation of GMA//nBMA/MMA/HEMA 5/10/10/2 (Molar)

A 3-liter round bottom 4-necked flask, was equipped with condenser/drierite tube, digital thermometer probe and $N_2$ inlet, mechanical stirrer and monomer addition funnel. Flask was then purged with $N_2$ and dried with a heat gun. While flushing the flask with $N_2$, 1016.4 g THF, 50.0 g 1-methoxy-1-trimethysiloxy-2-methyl propene were added via addition funnel and 2.5 g mesitylene was added with a syringe. The flask was cooled on ice bath to 4.8° C., and 2.5 mL of a 1M solution of tetrabutylammonium m-chlorobenzoate in acetonitrile was injected. Glycidyl methacrylate (GMA) (203.8 g) was added via addition funnel over a period of 30 min. The temperature rose to 34° C. in 25 min and the cooling was restarted to maintain the temperature below 35° C. for the rest of the time of GMA addition. At 40 min. from the start, the GMA conversion was 99.95%, the ice bath was removed and the second monomer feed (B block) was started. The primary components of the B block were n-butyl methacrylate (nBMA) (407.8 g), methyl methacrylate (MMA) (287.4 g) and 2-[trimethylsiloxy] hydroxy ethyl methacrylate (TMS-HEMA) (116.2 g). At 50 min. 0.6 mL catalyst was injected to speed up the reaction. Temperature rose to 70.2° C at the end of the feed (85 min). The monomer conversion (HPLC) at 208 min. was at least 99.6%. At 333 min from start, 7.7 g water was added and the flask was allowed to cool to room temperature. Actual solids of the polymer were 47.94%, $M_n$=4139 (theor. 3500), D (dispersity)=1.38.

Example 2

Preparation of nBMA/MMA/HEMA//t-BAEMA 10/10/2//3 (Molar)

A 3 liter round bottom 4-necked flask, was equipped with condenser/drierite tube, digital thermometer probe and $N_2$ inlet, mechanical stirrer and monomer addition funnel. Flask was then purged with $N_2$ and dried with a heat gun. While flushing the flask with $N_2$, 1100.9 g THF, 50.0 g 1-methoxy-1-trimethysiloxy-2-methyl propene were added via addition funnel and 2.5 g mesitylene was added with a syringe. 4.8 mL of a 1M solution of tetrabutylammonium m-chlorobenzoate in acetonitrile (herein called catalyst) was injected at room temperature and the first monomer feed was started. The primary components of the B block, which block was made first in this example, were n-butyl methacrylate (nBMA) (408.0 g), methyl methacrylate (MMA) (287.5 g) and 2-[trimethylsiloxy] hydroxy ethyl methacrylate (TMS-HEMA) (116.7 g) and were added via addition funnel over a period of 45 min. The temperature rose to 34.5° C. in 4 min and a cooling bath was used to maintain the temperature below 40° C. At 160 min. from the start, the monomer conversion was at least 99.6% as determined by HPLC. The ice bath was removed and the second monomer feed was started at 205 min. The primary component of the A block was tert-butyl aminoethyl methacrylate (t-BAEMA) (160.1 g). Feed II ended at 235 min from the start when temperature peaked at 32.7° C. At 335 min, water (32 g) was added and the reaction composition was allowed to cool to room temperature. Actual solids of the polymer were 44.81%, $M_n$=3996 (theor. 3300), D=1.81.

In the following Examples 3–6, selected AB block copolymers from the preceding examples were reacted with a heterocyclic group to form AB dispersants of the present invention. In Comparative Example 1, however, the indicated AB block copolymers were reacted with a tertiary aliphatic amine to give pendant t-amine functionality to the copolymer instead of heterocyclic functionality. In Comparative Example 2, no modifications were made to the basic AB block copolymer to provide a benchmark.

Examples 3, 4 and 5

Preparation of a Heterocyclic Modified AB Block Copolymer by Modification of AB Block Copolymer of Example 1

In a 2 liter round bottom flask equipped with a condenser, 1000 grams of AB block copolymer solution of example 1 were reacted with 55.5 grams of 2-methyl imidazole (Example 3), 55.5 grams of 4-methyl imidazole (Example 4) and 58.8 grams of morpholine (Example 5) by refluxing over 4 hours. Afterwards the polymer solution was diluted with n-butyl acetate to 40% solids.

AB block copolymer Example 3 had 3800 molecular weight ($M_n$) (dispersity(D)=1.48), Example 4 3700 (D=1.48) and Example 5 5800 (D=1.48).

Comparative Example 1

Procedure of Examples 3, 4 and 5 was repeated using 50.7 grams of 2-methyl ethanolamine instead of the heterocyclic derivatives for comparative purposes. This resulted in an AB block copolymer with t-amine groups in one block according to Hutchins et al., U.S. Pat. No. 4,656,226.

Comparative Example 2

The AB block copolymer of Example 1 with no modifications was employed for comparative purposes.

Example 6

Preparation of a Heterocyclic Modified AB Block Copolymer by Modification of AB Block Copolymer of Example 2

In a 6 liter round bottom flask 130 grams (1 mole) of n-3-aminopropyl imidazole in 1000 grams of n-butylacetate were reacted with 222 grams (1 mole) of isophorone diisocyanate dissolved in 387 grams of n-butylacetate by stirring 10 minutes at room temperature to form an isocyanate functional urea-imidazole intermediate. This intermediate was further reacted with 2300 grams of block copolymer of example 2. This resulted in an imidazole-urea modified AB block copolymer with number average molecular weight 5600 and weight average molecular weight of 10200.

Example 7

Evaluation of the Dispersant Properties

Dispersant quality in general is measured by sand grinding a mixture of pigment, solvent and dispersant and determining what proportion of dispersant (if any) will give a uniform dispersion, appearing like stained glass at an optical magnification of 250x. In contrast, flocculated pigment has islands of color interspersed with areas of relatively clear solvent. An arbitrary scale, as provided below, describes the degree of dispersion.

Following 5 pigments were evaluated: perylene maroon r-6436 from Bayer, phtalocyanine green 264-0414 from Sun Chemical, phtalocyanine blue bt-617-d from Clariant, carbon black 5000 ii powder from Columbian chemicals and quinacridone magenta rt-143-d from Ciba-geigy. In the evaluation 30 grams of ottawa sand were ground with 3.38 grams of 40% solids polymer solution (except in the case of the carbon black where 11.25 grams were used), 4.5 grams of pigment and 40 grams of n-butylacetate (non-polar organic solvent) in a gyro mixer for 15 minutes.

Afterwards the pigment dispersions were evaluated for flocculation by looking under the microscope for flocculation. On a rating from 0 to 10 (0 no flocculation, 10 strongly flocculated), the average score of the different AB block copolymers was as follows for the 5 pigments mentioned above:

| Results | |
|---|---|
| AB Dispersant | Flocculation Rating |
| Comparative Example 2 (no modification) | 5.5 |
| Example 3 | 0.5 |
| Example 4 | 0.5 |
| Example 5 | 2 |
| Comparative Example 1 (t-amine group) | 3.5 |

The above results show that the heterocyclic group modified AB copolymers show better pigment wetting characteristics and consequently improved dispersion with reduced flocculation.

Various modifications, alterations, additions or substitutions of the components of the compositions of this invention will become apparent to those skilled in the art without departing from the spirit and scope of this invention. This invention is not limited by the illustrative embodiments set forth herein, but rather is defined by the following claims.

What is claimed is:

1. A composition suitable for use as a pigment dispersant comprising an acrylic block copolymer having a relatively polar A segment and a relatively non-polar B segment, in which said A segment contains a heterocyclic group selected from the group consisting of mononuclear and/or dinuclear 5 and/or 6 membered rings containing at least one nitrogen atom not connected to a hydrogen atom.

2. The composition of claim 1 wherein the block copolymer is prepared by group transfer polymerization (GTP) techniques.

3. The composition of claim 1 wherein the block copolymer is formed from polymerized (meth)acrylic monomers.

4. The composition of claim 1 wherein the block copolymer is formed from polymerized methacrylic monomers.

5. The composition of claim 1 wherein the segment containing the heterocyclic group is prepared by reaction of an epoxy functional group on the segment with a heterocyclic compound containing a —NH—, —NH$_2$—, —COOH or —SH functional group.

6. The composition of claim 1 wherein the heterocyclic group is connected to the A segment through a urea and/or urethane linkage.

7. The composition of claim 1 wherein the block copolymer has a hydroxyl value of 5 to 120 and an overall number average molecular weight (Mn) of 1,300 to 13,000.

8. The composition of claim 1 wherein the heterocyclic group is selected from the group consisting of, unsubstituted or substituted, triazole, pyrimidine, imidazole, pyridine, morpholine, pyrrolidine, piperazine, piperidine, benzimidazole, benzothiazole and triazine.

9. The composition of claim 1 wherein the heterocyclic group is an imidazole derivative.

10. The composition of claim 1 of the AB configuration wherein the copolymer contains only one A segment and one B segment bonded together.

11. An acrylic AB block copolymer composition suitable for use as a pigment dispersant, comprising:
    about 10–30% by weight, based on the weight of the copolymer, of a relatively polar A segment; and,
    about 70–90% by weight, based on the weight of the copolymer, of a relatively non-polar B segment containing hydroxyl groups;
    each segment having a backbone preferably consisting essentially of polymerized methacrylic monomer units;
    wherein at least 50% by weight of the methacrylic moieties of said A segment have bonded thereto, either directly via an alkyl chain or indirectly via a urethane and/or urea linkage, a heterocyclic group selected from the group consisting of mononuclear and/or dinuclear 5 and/or 6 membered rings containing at least one nitrogen atom not connected to a hydrogen atom.

12. The composition of claim 11 wherein the heterocyclic group is selected from the group consisting of, unsubstituted or substituted, triazole, pyrimidine, imidazole, pyridine, morpholine, pyrrolidine, piperazine, piperidine, benzimidazole, benzothiazole and triazine.

13. The composition of claim 12 wherein the heterocyclic group is an imidazole derivative.

14. The composition of claim 13 wherein the heterocyclic group is 2-methyl imidazole or 4-methyl imidazole.

15. A pigment dispersion in an organic solvent dispersed by means of a composition of claim 1.

16. A coating composition comprising a pigment dispersion of claim 15, a film former and a liquid media.

17. An acrylic AB block copolymer composition suitable for use as a pigment dispersant, comprising:
    about 2–60% by weight, based on the weight of the copolymer, of a relatively polar A segment; and,
    about 40–98% by weight, based on the weight of the copolymer, of a relatively non-polar B segment containing hydroxyl groups;
    each segment having a backbone preferably consisting essentially of polymerized (meth)acrylic monomer units;

wherein at least 2% by weight of the (meth)acrylic monomer units of said A segment have bonded thereto, either directly via an alkyl chain or indirectly via a urethane and/or urea linkage, a heterocyclic group selected from the group consisting of mononuclear and/or dinuclear 5 and/or 6 membered rings containing at least one nitrogen atom not connected to a hydrogen atom.

* * * * *